United States Patent [19]

Weathers

[11] 4,262,866
[45] Apr. 21, 1981

[54] KITE HAVING HIGH LIFT TO DRAG RATIO

[76] Inventor: Warren O. Weathers, 17707 SE. Howard St., Milwaukie, Oreg. 97222

[21] Appl. No.: 82,869

[22] Filed: Oct. 9, 1979

[51] Int. Cl.³ .......................................... B64C 31/06
[52] U.S. Cl. ................................. 244/153 R; D21/88
[58] Field of Search ............. 244/153 R, 154, DIG. 1; 46/77, 81; D21/88, 89

[56] References Cited

FOREIGN PATENT DOCUMENTS

| 411260 | 11/1923 | Fed. Rep. of Germany | 244/153 R |
| 23493 | of 1907 | United Kingdom | 244/153 R |
| 555542 | 8/1943 | United Kingdom | 244/153 R |
| 1340047 | 12/1973 | United Kingdom | 244/153 R |

OTHER PUBLICATIONS

"The Penguin Book of Kites", David Pelham, published 1969, pp. 92 & 74, Figures 4, 2 & 1.

Primary Examiner—Charles E. Frankfort
Attorney, Agent, or Firm—Adrian J. LaRue

[57] ABSTRACT

A kite of the winged and canopy type includes a central section of substantially rectangular configuration, triangular-shaped wings extending along the sides of the central section, and triangular-shaped keel sections also extending along the central section sides. A spar extends across the kite from the apex of the wings and through the keel sections. A spar pole extends between the spar and central longeron to form a canopy of the central section and means to secure the spar, central longeron and spar pole together when the kite is assembled.

9 Claims, 3 Drawing Figures

KITE HAVING HIGH LIFT TO DRAG RATIO

BACKGROUND OF THE INVENTION

Kites are known that have a wing extending outwardly from each longitudinal side and a keel extending along each longitudinal side. A spar extends across the kite from wingtip to wingtip. These kites have been identified as a winged canopy or winged sled kite. The drawbacks of this type of kite are:

The canopy or center section develops flutter which causes drag and undesirable steering forces, the non-reinforced leading edges of wings also tend to develop flutter that also causes drag and undesirable steering forces; in light wind and variable wind condition, the canopy will collapse, which will unbalance the kite and cause side slippage toward the ground, and the lift to drag ratio is low.

SUMMARY OF THE INVENTION

The present invention is realized by a sheet of lightweight material which includes a central section and keel sections. The central section includes tapered sides, a straight trailing edge, and a serrated leading edge. The keels are scalene triangles with the longer sides being coincident with the tapered sides of the central section and the shorter sides are the leading edges. Wings also of scalene triangular configuration have their longer sides secured along the coincident edges of the tapered sides of the central section and longer sides of the keels respectively with the shorter sides thereof being the leading edges which have stiffeners therealong. A spar extends between the tips of the wings across the kite and longerons extend along the tapered sides and along the center of the central section. A spar pole extends between the spar and the center longeron with means to maintain the spar pole, spar, and center longeron in connection with each other. A bridle has each end connected to the apex of the keels.

A primary object of the present invention is to provide a winged kite that has an excellent wind range index that enables it to fly in light to strong winds, has a very high lift to drag ratio, and a very high angle of flight.

Another object the present invention is the provision of a winged kite that has a spar pole extending between the spar and a center longeron of a central section to form the central section into a canopy.

A further object of the present invention is to provide means to secure the spar pole, the spar, and the center longeron together.

Another object of the present invention is the provision of the leading edge of the canopy section having a V-shape which reduces leading edge flutter and consequent drag as well as undesirable steering forces.

An additional object of the present invention is to provide stiffeners along the leading edges of the wings to prevent flutter and resultant drag.

The foregoing and other objects of the present invention will appear more fully from the following description and the accompanying drawings which illustrate a preferred embodiment of the invention. It is to be understood that changes may be made from the exact details shown and description without departing from the principles of the invention.

DETAILED DESCRIPTION OF THE INVENTION

Figure 1:
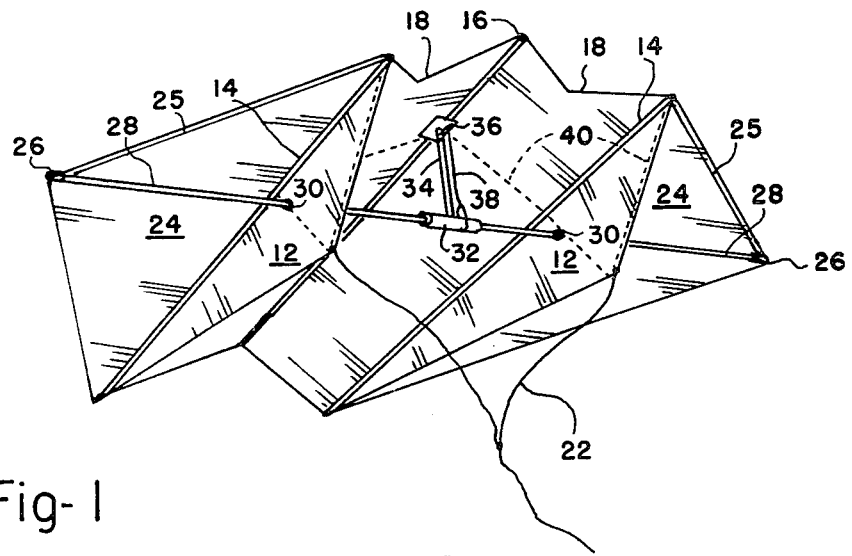
FIG. 1 is a perspective view of the winged kite.
Figure 2:
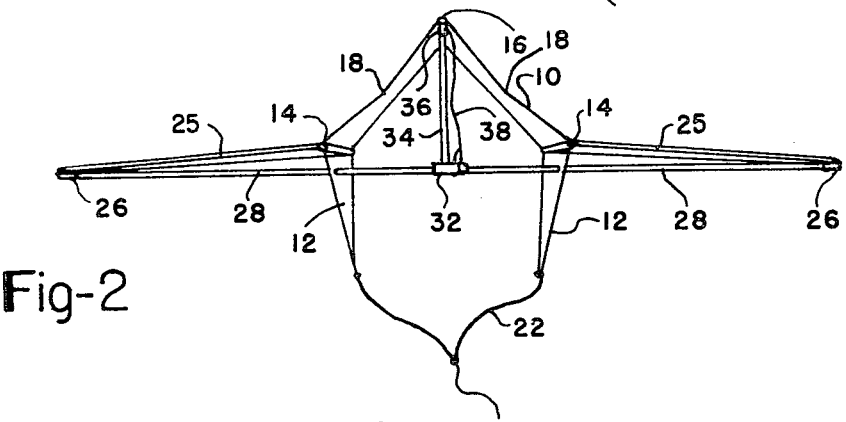
FIG. 2 is a front elevational view of the winged kite.
Figure 3:
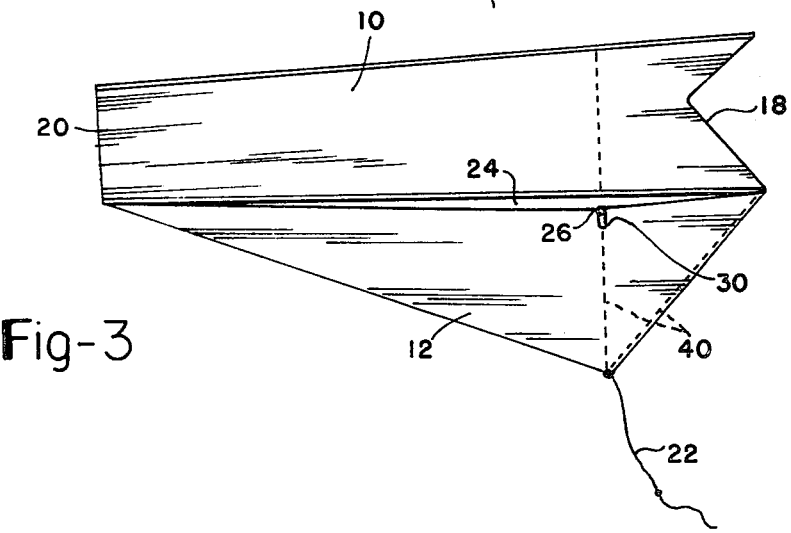
FIG. 3 is a side elevational view of the winged kite.

Turning now to the drawings, a thin sheet of material that is impervious or semipervious to air includes a central section 10 and keel sections 12. Central section 10 has outside longerons 14 secured along its length and they taper slightly inward toward a center longeron 16 that is secured along the center of central section 10. The outside longerons can be parallel to the center longeron 16 if desired. Leading edge 18 of central section 10 has a V-shaped configuration between outer longerons 14 and center longeron 16. More than one V-shaped configuration can be provided in leading edge 18 on each side of center longeron 16. For smaller size kites, leading edge 18 can be a single V-shaped configuration between outer longerons 14. Trailing edge 20 of central section 10 is straight, but it can have other shapes.

Keels 12 are in the form of a scalene triangle with the long sides being coincident with the outer side of central section 10 containing outer longerons 14. The short sides of keels 12 are leading edges and the apex of each keel 12 has an end of bridle 22 secured thereto through reinforced holes thereof.

Wings 24 are also in the form of a scalene triangle and they have the long sides respectively secured along the sides of central section 10. Stiffeners 25 are secured along the leading edges of wings 24 and they can be made of wood, plastic, or the like. The material for central section 10, keels 12, and wings 24 can be thin plastic material and wings 24 are secured to central section 10 via tape, sewing, suitable glue, or heat welding. Any material that is light in weight and impervious to air can be used. Longerons 14 and 16 are preferably wood dowels that are secured in position by tape, glue or welding.

Sockets 26 of plastic or other suitable material are secured at the apex of wings 24 and they receive the outer ends of spar sections 28 which are also preferably wooden dowels. Spar sections 28 pass through holes 30 in keels 12 and their inner ends are connected together via a metal coupling member 32 to form a spar that extends across the kite to maintain it in a flyable configuration and to maintain the wings in an operable condition.

Spar pole 34 is preferably a wooden dowel and it has one end connected to center longeron 16 via a plastic socket 36 secured to longeron 16 and the other end of spar pole 34 is disposed in a hole in coupling member 32. Spar pole 34, in position between longeron 16 and the spar coupling member 32, forms central section 10 of the kite into a canopy having a V-shape. A stay line 38 of string or the like has one end secured to longeron 16 and its other end has a loop that fits onto coupling member 32, thereby securing spar pole 34, longeron 16, and the spar 28 together so they cannot become disconnected during the time the kite is flying.

Spar pole 34 and stay line 38 can be combined by providing a bayonet-type coupling at the ends of the spar pole and socket 36 and coupling member 32. Glass reinforced tape 40 is provided along central section 10 and keel sections 12 as well as the leading edges of keel sections 12 to lend strength to these sections.

While wings 24 and keels 12 are illustrated as being scalene triangles, they can have other triangular configurations if desired.

The unique features of the present invention as outlined above provide a kite that has an unusually high lift to drag ratio resulting in high angle of flight, more stable operation, minimum flutter in leading edge surfaces, flies in very low winds, will self-launch from the ground, and will fly in a large range of wind velocities. The kite can be readily assembled for flying and disassembled and rolled into a compact condition for storage when not flying. Although the invention has been explained with reference to a particular embodiment, it is to be appreciated that various adaptations and modifications may be made without departing from the appended claim.

The invention is claimed in accordance with the following:

1. A kite comprising a central section of flexible material having sides, a front end, and a rear end;
   outer longerons extending respectively along the sides of said central section and a central longeron extending along the center of said central section;
   wing means of flexible material and having a substantially triangular configuration extending along the respective sides of said central section;
   keel means extending along the respective sides of said central section and onto which a bridle means can be secured;
   spar means having ends thereof connected to apexes of said wings, extending across said kite and through said keel means to maintain said kite in a flying condition with said longerons above said spar means; and
   spar pole means extending between said spar means and said central longeron to form said central section into an inverted substantially V-shaped canopy with said central longeron extending above said outer longerons.

2. A kite according to claim 1 wherein the leading edge of said central section has a V configuration.

3. A kite according to claim 1 wherein stiffener means extend along leading edges of said wings.

4. A kite according to claim 1 wherein means to secure said spar pole means said spar means, and said central longeron together.

5. A kite comprising a central section of flexible material having a substantially rectangular configuration;
   outer longerons extending respectively along the sides of said central section and a central longeron extending along the center of said central section;
   triangular-shaped wings of flexible material extending along the respective sides of said central section;
   triangular-shaped keels extending along the respective sides of said central section, apexes of said keels adapted to have ends of bridle means secured thereto;
   spar means having ends thereof connected to apexes of said wings, extending across said kite and through said keels to maintain said kite in a flying condition; and
   spar pole means extending between said spar means and said central longeron to form said central section into an inverted substantially V-shaped canopy.

6. A kite according to claim 5 wherein means secure said spar pole means, said spar means, and said central longeron together.

7. A kite according to claim 5 wherein the leading edge of said central section has a V-shape configuration.

8. A kite according to claim 5 wherein leading edges of said wings have stiffener means.

9. A kite according to claim 5 wherein said outer longerons are slightly tapered inward toward said central longeron from the leading end to the trailing end.

* * * * *